United States Patent [19]
Rabii et al.

[11] Patent Number: 5,220,414
[45] Date of Patent: Jun. 15, 1993

[54] TWO-LINE COMB FILTERING WITH SPATIAL MIXING

[75] Inventors: Khosro Rabii, Arlington Heights, Ill.; Heinrich Koehne, Emmendingen, Fed. Rep. of Germany

[73] Assignees: Deutsche ITT Industries GmbH, Freiburg, Fed. Rep. of Germany; Zenith Electronics Corp., Glenview, Ill.

[21] Appl. No.: 775,925
[22] PCT Filed: May 8, 1990
[86] PCT No.: PCT/EP90/00738
 § 371 Date: Nov. 1, 1991
 § 102(e) Date: Nov. 1, 1991
[87] PCT Pub. No.: WO90/13978
 PCT Pub. Date: Nov. 15, 1990

Related U.S. Application Data

[63] Continuation-in-part of Ser. No. 349,192, May 9, 1989, abandoned.

[51] Int. Cl.[5] .............................................. H04N 9/78
[52] U.S. Cl. ..................................... 358/31; 358/21 R
[58] Field of Search ......................... 358/21 R, 31, 329

[56] References Cited

U.S. PATENT DOCUMENTS

| | | | |
|---|---|---|---|
| 4,141,035 | 2/1979 | Maxemchuk et al. | 358/31 |
| 4,636,840 | 1/1987 | McNeely et al. | 358/31 |
| 4,789,890 | 12/1988 | Itoh et al. | 358/31 |
| 5,146,318 | 9/1992 | Ishizuka et al. | 358/31 |

Primary Examiner—Edward L. Coles, Sr.
Assistant Examiner—Kim Yen Vu
Attorney, Agent, or Firm—Thomas L. Peterson

[57] ABSTRACT

A method and a circuit arrangement for two-line comb filtering a sampled and digitized composite color signal are disclosed wherein, depending on the similarity status determined by means of a display area (27) via a local and temporal gradient analysis, the respective type of luma/chroma separation, namely two-line combing, combing up, combing down, or simple decoding, and the respective proportion of combing and simple decoding in the luma and chroma output signals (LO-21, CO-21) are determined for each pixel.

17 Claims, 6 Drawing Sheets

| COMB | M1 | M2 |
|---|---|---|
| 2H - COMB | 1 | 1 |
| U - COMB | 1 | 0 |
| L - COMB | 0 | 1 |

| PROPORTION | COMB | | | S-DEC | | | PROPORTION |
|---|---|---|---|---|---|---|---|
| | S1 | S2 | S3 | S4 | S5 | S6 | |
| 1 | 1 | 0 | 0 | 0 | 0 | 0 | 0 |
| 3/4 | 1 | 0 | 1 | 1 | 1 | 1 | 1/4 |
| 1/2 | 1 | 1 | 0 | 1 | 1 | 0 | 1/2 |
| 1/4 | 1 | 1 | 1 | 1 | 0 | 1 | 3/4 |
| 0 | 0 | 0 | 0 | 1 | 0 | 0 | 1 | ns
TWO-LINE COMB FILTERING WITH SPATIAL MIXING

CROSS REFERENCE TO RELATED APPLICATIONS

This application is a Continuation-In-Part application of U.S. patent application Ser. No. 07/349,192 filed May 9, 1989 is now abandoned.

BACKGROUND OF THE INVENTION

1. Field of the Invention

The present invention relates to a method of and a circuit arrangement for processing color video signals, particularly NTSC color television signals.

2. Brief Description of the Prior Art

In the NTSC standard, the phase of the chroma signal is reversed on successive horizontal lines and, thus, inverted. This condition lends itself to comb filtering to separate the luminance components from the chrominance components. For the sake of simplicity, luminance will hereinafter be referred to as "luma" and chrominance as "chroma". In comb filtering, successive horizontal lines of the video signal are added and subtracted together. The addition provides the luma signal component (the chroma components are oppositely phased and are thus cancelled in the addition), and the subtraction provides the chroma signal component (the luma components are cancelled in the subtraction because they are always in phase). Comb filtering produces high-quality separation of the chroma and luma signals except where there are significant changes in the luma or chroma signal from line to line. In those cases, comb filtering introduces distortions and artifacts because of the dissimilar information that is being combined.

In color signal processing without comb filtering, hereinafter referred to as "simple decoding", the luma-chroma compbsite signal is passed through a selective color sub-carrier frequency trap (=color trap) to obtain the luma component, and through a chroma bandpass filter to cbtain the chroma component. The 3.58-MHz color trap destroys luma resolution in that frequency range. The band-pass filter, which has a mid-frequency of 3.58 MHz, also passes luma components which mix with the chroma components, thus creating untrue colors. The benefit of comb filtering is that luma resolution is not reduced in the vicinity of the color subcarrier frequency, and that color decoding is not disturbed by luma components. On the pther hand, comb filtering of video signals which have significant vertical transitions, particularly color transitions, produce various artifacts that can be very disconcerting to a viewer.

A certain remedy for these disturbing effects is provided by the well-known "two-line comb filter", which combines the video signals from three horizontal lines, e.g., the line of concern and one line above and one line below. In that two-line comb filter, luma/chroma separation by comb filtering is effected only when there are no vertical transitions present. If vertical transitions exceed a predetermined level, e.g., a noise threshold, no signal combing is performed. The prior art circuit samples vertically aligned pixels from the line above and the line below, and compares the sample values with a reference value formed from the sample values of horizontally aligned pixels. It then makes a decision as to whether to "two-line comb" (upper and lower horizontal lines with the center horizontal line) or to simple decode the video signal. The sampled video display area includes seven video pixels; five adjacent pixels on the horizontal line being processed, one pixel on the line above, and one pixel on the line below. The comparison is performed essentially only with the chroma component of the pixels, because the video signal was previously filtered by means of a chroma bandpass filter.

The decision to either two-line comb process or to simple decode is based upon comparing the differences between the two vertically aligned pixels in the upper and lower lines and the difference between the end pixels of the horizontally aligned pixels (=line). The prior art circuit thus covers only the two main directions in the vicinity of the pixel to be processed. The system lacks, for example, any diagonal comparisons of pixels and is consequently limited in its ability to determine when comb processing is desirable. Consequently, the prior art system often introduces undesirable artifacts into the video display since proper combing operation does not occur at many critical situations where the line at the center is different from the two upper and lower lines. Further, the prior art circuit is highly noise-sensitive since the noise threshold is fixed and not adaptive to the incoming video signal.

SUMMARY OF THE INVENTION

It is, therefore, the object of the invention as claimed to provide a method and a circuit arrangement which permit improved comb filtering.

The main idea of the invention is to control, via improved similarity criteria of the unfiltered area around the pixel, a likewise improved decision process for the separation to be performed, taking into account for each pixel the respective type of processing (=different types of combing), the relative proportions of comb processing and simple decoding, and the processing decision for a number of previous pixels.

According to the invention, the similarity criteria are derived from gradients of the video signal which are determined in a relatively large display area around the pixel to be processed. Signal changes in the vertical direction are determined by means of diagonal gradients, which are obtained by comparing diagonally adjacent pixels of the same phase. Logic control circuitry determines whether or not to comb process the video signal as well as the type of combing to be performed.

According to the invention, a processing decision is made for each pixel based upon a gradient analysis of a video display area embracing eleven pixels. The pixel to be processed is at the center of the display area. The respective processing decision is then modified based upon existing processing decisions which were made for the adjacent pixels.

Taking into account previous and subsequent pixels in the processing decisions necessitates storing the pixels and the processing decisions. In the preferred embodiment of the invention, the stored pixels and processing decisions are logically combined to determine the type of processing:

combing over all three lines=two-line combining=2H-COMB;

combing over the line at the center and the line above=combing up=U-COMB;

combing over the line at the center and the line below=combing down=L-COMB;

simple decoding=S-DEC, and the respective proportion of comb processing and simple decoding.

An important benefit of comb filtering in accordance with the invention is that the effect of noise in the video display is reduced because noise is averaged over a larger display area and, therefore, interferes less with the decision as to the type of combing to be performed. Furthermore, the gradient analysis is performed with unfiltered pixel values, so that no information for the decision process is lost.

BRIEF DESCRIPTION OF THE DRAWINGS

The invention and further advantages thereof will now be explained in greater detail with reference to the accompanying drawings, in which.

DETAILED DESCRIPTION OF THE PREFERRED EMBODIMENTS

It will be understood that the preferred embodiment is described in connection with a conventional NTSC color television system; because of the similar color signal decoding, however, the principles of the invention apply equally well to PAL color television systems. In the NTSC color television system, the chroma signal phase is reversed, i.e., inverted, on successive lines—the luma phase does not change. By combing, i.e., adding and subtracting adjacent lines, the chroma component can be separated from the luma component. However, luma- or chroma-signal transitions in the vertical direction cause difficulty and produce artifacts. At horizontal signal transitions, i.e., at vertical edges, "dot crawl" and very poorly defined vertical color edges are generated. At vertical signal transitions, i.e., at horizontal edges, "hanging dots", i.e., serrated edges, are created.

Figure 1:
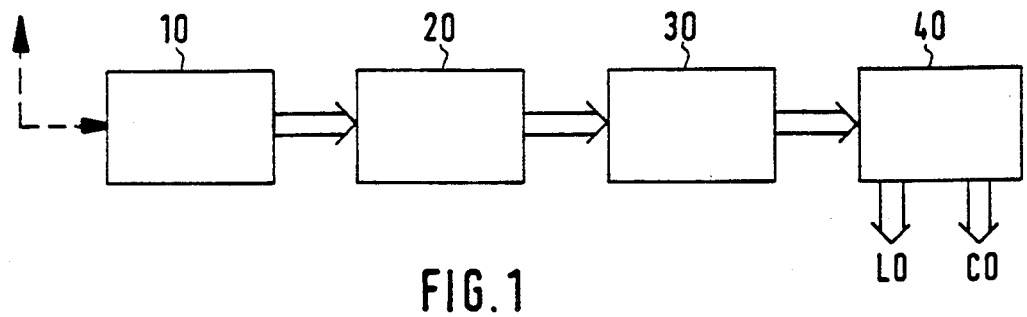
FIG. 1 is a simplified block diagram showing the individual functional units of the invention.

The invention permits a precise analysis of the area around the respective pixel in the entire video display, which typically consists of 483 visible horizontal lines of 910 pixels each. As shown in FIG. 1, a video-signal source 10 supplies the individual pixels to a block 20 which represents a gradient-measuring device and supplies a block 30 which makes the logical group decisions. This group decision logic is followed by a block 40 which is a luma/chroma separator with signal mixers . Ihe output of this mixer provides the separated luma and chroma components LO, CO.

In order to process a pixel based upon video signals which have occurred in the previous line or which are to occur in the subsequent line, a storage mechanism is necessary. The circuit arrangement of FIG. 3 therefore has a series of delay circuits that together provide storage for two horizontal lines plus two pixels, i.e., a total of 1822 pixels. Instead of the delay circuits, random-acces memories with adapted address control may be used, of course. The display area 27 used for determining the gradients embraces eleven pixels extending over three horizontal lines, cf. FIG. 2.

Figure 2:
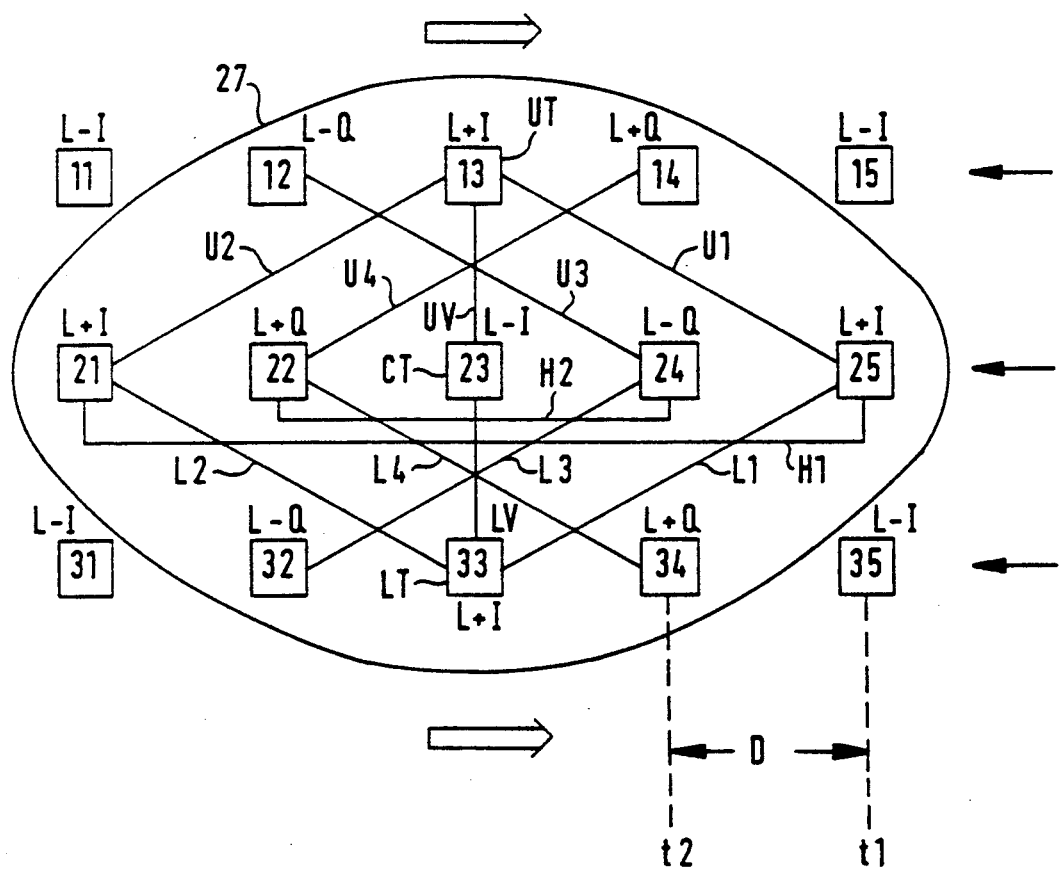
FIG. 2 is a schematic illustration of a portion of a video display with various sampled pixels in connection with a display area in accordance with the invention.

FIG. 2 shows schematically, in the form of an enlarged portion of a video display, the display area 27, which covers a portion of three horizontal lines. The individual squares represent pixels and are numbered consecutively: 11 through 15 on the upper line, 21 through 25 on the middle line, and 31 through 35 on the lower line, with pixel 35 being the "youngest" pixel. Above the pixels, the associated signal components are given in capital letters, with "L" standing for the luma component, and "I" and "Q" for the in-phase and quadrature components, respectively, of the chroma signal. A positive or negative sign indicates whether the respective chroma signal has the correct phase position or the inverted phase position. The relationship between the luma component L and the two quadrature components I, Q of the chroma signal follows from the NTSC standard, the phase relationships being particularly simple (as in FIG. 2) if the sampling rate is four times the color subcarrier frequency, i.e., $4 \times 3.58$ MHz. Thus, the vertically aligned pixels in two successive lines have opposite chroma signal phase relationships.

The display area 27 moves on the screen from left to right synchronously with the horizontal deflection, so that the video signals entering the areas 15, 25, and 35 at the instant t1 will be in the adjacent areas 14, 24, 34 one sample period D later, at the instant t2. The video information thus moves from right to left through the display area 27. The display area 27 can thus be implemented in the form of a horizontal delay chain into which the sampledvideo signal is fed on the right- or left-hand side. The pixels then correspond to the contents of the individual delay stages, cf. FIG. 3.

The three vertically aligned pixels 13, 23 and 33 at the center will hereinafter be referred to as "upper pixel UT", "center pixel CT", and "lower pixel LT", respectively. Additionally, FIG. 2 contains a number of lines which represent gradients and interconnect various individual pixels. For example, pixels 13 and 25 in the diagonal direction are joined by a line labelled U1, pixels 13 and 21 by a line labelled U2, pixels 12 and 24 by a line labelled U3, and pixels 14 and 22 by a line labelled U4. Similarly, lines L1 through L4 interconnect diagonally displaced pixels in the second and third lines. The vertically aligned pixels 13 and 23 are connected by a line labelled UV, and the vertically aligned pixels 23 and 33 by a line labelled LV. The horizontally displaced pixels 21 and 25 are coupled by a line labelled H1, and the horizontally displaced pixels 22 and 24 by a line labelled H2. It will be noted that the H designation stands for horizontal, the U designation stands for upper, the L designation for lower, and the V designation for vertical. The various samplings and comparisons that are made in accordance with the invention are with respect to the pixel signal levels. The evaluation of diagonal gradients provides the desired fine vertical resolution of the display area to be examined. Distortions due to noise components are largely averaged out by the inclusion of areas.

The lines labelled UV and LV, strictly speaking, do not represent gradients but serve as vertical calculation quantities for the gradient analysis.

Figure 3:
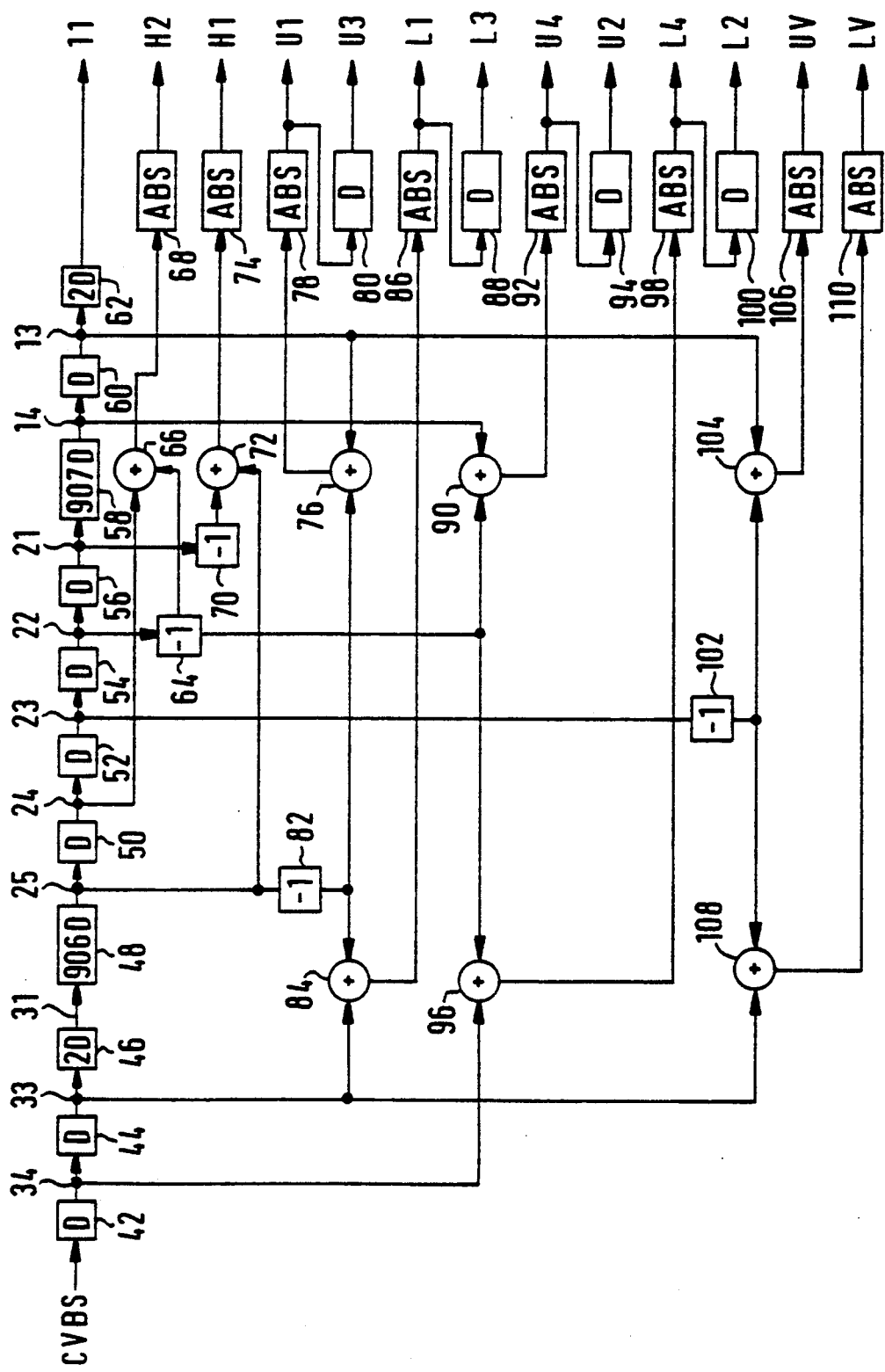
FIG. 3 is a block diagram of the gradient-measuring device.

In FIG. 3, which shows an embodiment of the gradient-measuring device 20, a color video baseband signal CVBS is applied to a one pixel delay circuit 42 (one unit of pixel delay is labelled "D") whose output is coupled to another one pixel delay circuit 44. The delay circuit 44, in turn, is coupled to a two pixel delay circuit 46 which is followed by a 906 pixel delay circuit 48. To delay one full line, 910 units of pixel delay D are necessary.

The output of the 906 pixel delay circuit 48 is coupled to the input of a series combination of four one pixel delay circuits 50, 52, 54 and 56, the output of which is coupled to the input of a 907 pixel delay circuit 58. The output of the latter is connected to the input of a one pixel delay circuit 60 whose output feeds a two pixel delay circuit 62 which produces an output labelled "11", which corresponds to pixel 11 in FIG. 2. The numbers of the pixels in the display area 27 of FIG. 2 at any given time are indicated at the associated junctions of the delay circuits of FIG. 3. For example, pixel 13 is at the junction of the pixel delay circuits 60 and 62, pixel 14 appears at the junction of the delay circuits 58 and 60, etc.

By the series-connected pixel delay circuits 42 through 62, 1822 pixels, i.e., two horizontal lines plus two pixels, are stored. The 1822 pixels thus contain all video signals of the display area 27 of FIG. 2. The various samplingsor gradients between the pixels in the display area 27 are formed from the stored pixels by a combination of inverters and adders. Pixel 22 in FIG. 3 is applied to an inverter 64 (inverters are indicated by "−1") which, in turn, is coupled to an adder 66. At the same time, pixel 24 is applied to an adder 66, and the result is fed to an absolute value device (=ABS) 68, whose output delivers the gradient H2. From FIG. 2 it can be seen that the gradient H2 results from subtracting pixels 24 and 22 from each other. Pixel 21 is applied through an inverter 70 to an adder 72, where it is combined with pixel 25. The output of the adder 72 is supplied to an absolute value device 74, which delivers the gradient H1. Pixel 25 is also applied through an inverter 82 to an adder 76 whose other input is fed with pixel 13. The output of the adder 76 is coupled to an absolute value device 78 whose output provides the gradient U1. The output of the absolute value device 78 is also coupled to the input of a one pixel delay circuit 80 which delivers the gradient U3.

From FIG. 2 it can be seen that for a pixels area moving from right to left and reaching the pixels 15, 14, 13, etc., the gradient U1 becomes the gradient U3 one sampling period later. Therefore, the gradient U3 may be developed by simply delaying the gradient U1 by one sampling period (=unit of single pixel delay D).

The inverter 82 in FIG. 3 is also coupled to an adder 84 which adds pixel 33 to develop, via an absolute value device 86, the gradient L1. By means of a one pixel delay circuit 88, whose input is connected to the output of the absolute value device 86, the gradient L3 is formed from the gradient L1. This is done in the same manner as discussed for gradients U3 and U1. The output of the inverter 64 (=negative pixel 22) is also applied to an adder 90 and an adder 96 which are supplied with pixels 14 and 34, respectively, to develop, via absolute value devices 92 and 98, the gradients U4 and L4, respectively. The two gradients U4, L4 are delayed by one pixel delay circuits 94 and 100, respectively, to develop the gradients U2 and L2. Finally, pixel 23 is applied to an inverter 102 whose output is coupled to an adder 104 and an adder 108 which are supplied with pixels 13 and 33, respectively. The outputs of the adders 104 and 108 are applied to absolute value devices 106 and 110, respectively, to develop the gradients LV and UV.

Figure 4:
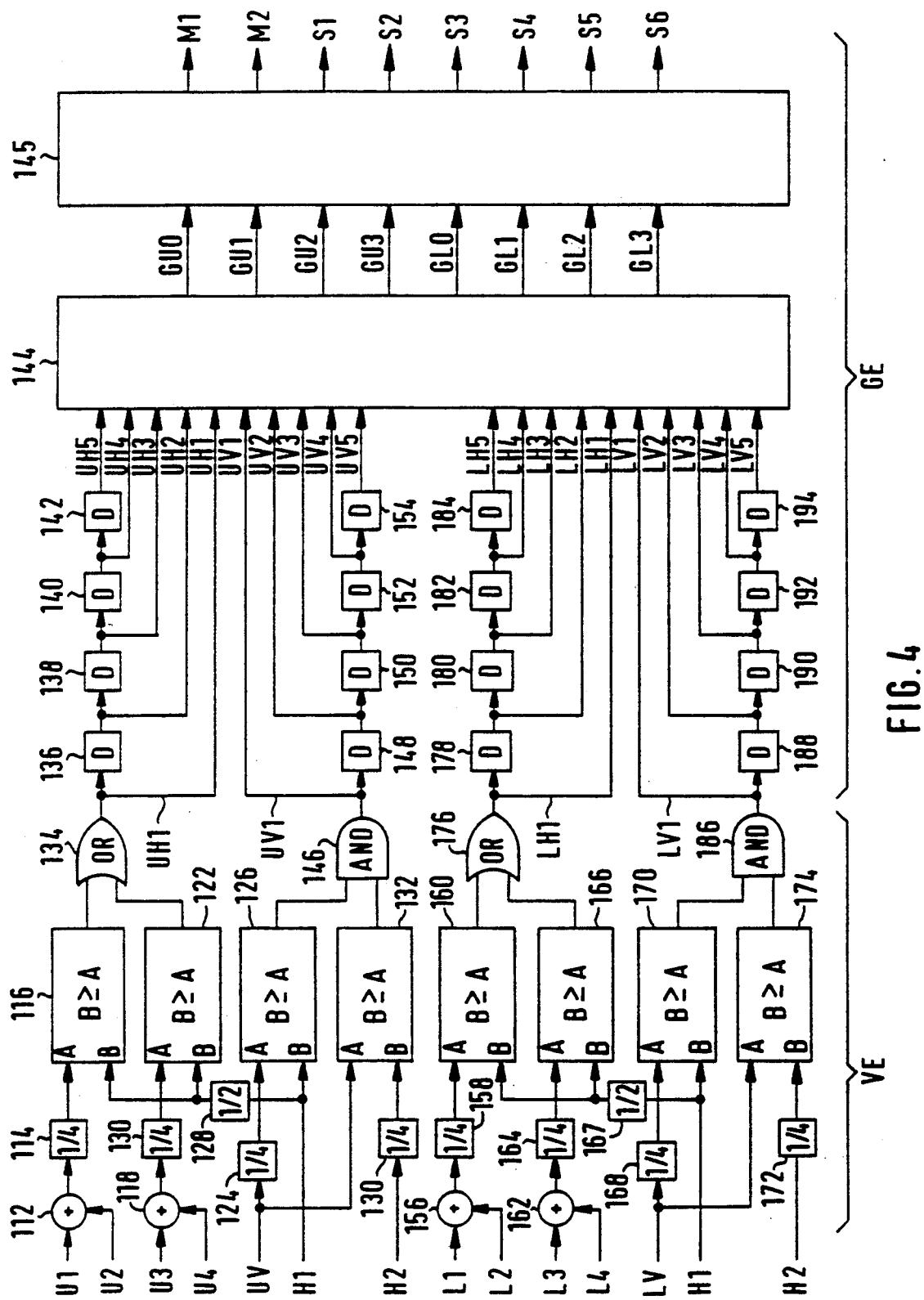
FIG. 4 is a block diagram of the group decision logic.

In FIG. 4, which shows the group decision logic 30 in a block diagram, the various gradients are applied through a plurality of adders and amplifiers to the inputs of a plurality of comparators for further application to logic means.

The gradients U1 and U2 are applied to an adder 112 whose output is connected via a divide-by-four stage 114 to the input A of a comparator 116. The gradients U3 and U4 are applied to an adder 118 whose output is coupled through a divide-by-four stage 120 to the input A of a comparator 122. The B terminals of the comparators 116 and 122 are supplied with the gradient H1 via a divide-by-two stage 128. The comparators 116, 122 and the subsequent comparators compare the signals at the terminals A and B and, if B is greater than or equal to A, a logic 1 output is developed. As can be seen from FIGS. 2 and 4, the comparator 116 compares one fourth of the sum of the two gradients U1 and U2 with one half of the gradient H1. For a condition of uniform chroma and luma in the display area 27, the gradients U1, U2 and H1 will all be equal. Consequently the sum of the gradients U1 and U2 divided by four will be equal to the value of the gradient H1 divided by two, and the comparator 116 will thus produce a logic 1 output. The comparator 122 similarly produces a logic 1 output based upon the inputs of the gradients U3 and U4 compared with the gradient H1.

The gradient H1 is also applied to the input B of a comparator 126, whose input A is supplied with the gradient UV through a divide-by-four stage 124. The gradient UV is also applied directly to the input A of a comparator 132, whose input B is supplied with the gradient H2 through a divide-by-four stage 130. As seen from FIGS. 2 and 4, the gradient UV is the difference between the vertically oriented pixels 13 and 23, and the gradient H2 is the difference between the horizontally oriented pixels 22 and 24. It will be noted that pixels 13, 23, 22, and 24 bear different phase relationships. Consequently, even for transition-free, i.e., constant, chroma and luma signals, these pixels may have different values. This is compensated by comparing one quarter of the gradient UV with the gradient H1 in the comparator 126 and one quarter of the gradient H2 with the gradient UV in the comparator 132, and applying the outputs of the two comparators to an AND gate 146. By the inclusion of the two horizontal gradients H1, H2, by which the signal changes in the horizontal direction are determined, a signal-dependent comparison threshold is formed for the gradients.

The outputs of the comparators 116 and 122 are applied to an OR gate 134, and the outputs of the comparators 126 and 132 are applied to the AND gate 146. The "in-phase" gradient comparisons are thus ORed, and the "out-of-phase" gradient comparisons are ANDed.

The output of the OR gate 134 is connected to a series combination of four delay circuits 136, 138, 140 and 142 to take into account the four previous decision signals UH2 through UH5 in addition to the current decision signal UH1.

The current single decision in FIG. 4 and FIG. 2 is the decision for pixel 23, while the group decision, which will be described in greater detail below, is the decision for pixel 21. The group decision determines the luma/chroma separation process to be performed. The group decision in the logic unit 144 represents a spatial filter circuit for the single decisions, so to speak, which prevents disturbing picture reproduction effects during the pixel-by-pixel switching of the process for luma/chroma separation.

Similarly to the OR gate 134, the AND gate 146 has its output coupled to a series combination of four delay circuits 148, 150, 152 and 154 to produce, besides the current decision signal UV1, the four previous decision signals, which are labelled UV2 through UV5. These decision signals are applied to the logic unit 144, whose operation is illustrated in a logic table.

The lower half of the circuit arrangement of FIG. 4 is designed for the lower gradients L . . . of the display area 27. The gradients L1 and L2 are applied to an adder 156, whose output is applied through a divide-by-four stage 158 to the input A of a comparator 160. Similarly, the gradients L3 and L4 are applied to an adder 162, whose output is fed through a divide-by-four stage 164 to the input A of a comparator 166. The B inputs of these comparators are supplied with the gradient H1 through a divide-by-two stage 167. A comparator 170 has its A input supplied with the gradient LV through a divide-by-four stage 168, and its B input is supplied directly with the gradient H1. A comparator 174 has its A input supplied directly with the gradient LV, and its B input is supplied with the gradient H2 via a divide-by-four stage 172. The outputs of the comparators 160 and 166 are applied to an OR gate 176, and the outputs of the comparators 170 and 174 are applied to an AND gate 186.

The output of the OR gate 176 is supplied to a series combination of four identical delay circuits (each providing a delay D) 178, 180, 182, and 184 to obtain, in addition to the current decision signal LH1, the four previous decision signals LH2 through LH5. Similarly, the AND gate 186 feeds a series combination of four identical delay circuits 188, 190, 192, and 194 to obtain, in addition to the current decision signal LV1, the four previous decision signals LV2 through LV5. All twenty decision signals are applied to the logic unit 144, where they produce eight status signals GUO through GU3 and GLO through GL3, which are applied to an evaluation unit 145 whose operation is represented by the flow charts of FIGS. 5A through 5D.

A further improvement of the "out-of-phase" gradient comparisons results if the comparators 126, 132, 170, and 174, besides performing the signal comparison proper, monitor the absolute level of one of their input signals and produce a logic 1 output if the respective signal level is less than or equal to a predetermined threshold (=S). For example, a logic 1 output is produced by the comparator 126 if UV/4 is less than or equal to 7, by the comparator 132 if UV is less than or equal to 7, by the comparator 170 if LV/4 is less than or equal to 7, and by the comparator 174 if LV is less than or equal to 7.

It will be appreciated that the optimum selection of the portions of the various gradients to be combined for the similarity analysis in the display area 27 is subjective. The same applies to the logic function described in the logic table and to the subsequent operations in the evaluation unit 145. The proportions indicated were developed after testing and using computer simulations based upon a wide variety of available video signals. The method described and the circuit arrangement for carrying out the same represent a preferred embodiment of the invention for NTSC television signals. However, this should not be considered as a limitation on the broader aspects of the invention which permit an improvement in picture quality even in high definition television systems.

In connection with the description of the flow charts of FIGS. 5A through 5D, it will be shown that based on the eight status signals for the pixel 21, the group decision is made to determine the type of combing (2H-, U- or L-COMB) to be performed and the percentages of the separated luma and chroma signals to be comb-filtered and those to be simple-decoded (S DEC).

The eight status signals at the output of the logic unit 144 are developed from the twenty decision signals based upon the following logic table, in which Boolean algebra notation is utilized, with an OR operation being indicated by a "+" sign and and AND operation by a ".".

| Logic Table |
| --- |
| GU0 = (UH3) + (UV2 · UV3 · UV4) |
| GU1 = ((UH5 · UH4 · UH2 · UH1)) + ((UV1 · UV2 · UV3) + (UV3 · UV4 · UV5)) |
| GU2 = (UH4 · UH2) + (UV1 · UV2 · UV4 · UV5) |
| GU3 = ((UH5 · UH4) + (UH2 · UH1)) + ((UV1 · UV2) + (UV4 · UV5)) |
| GL0 = (LH3) + (LV2 · LV3 · LV4) |
| GL1 = ((LH5 · LH4 · LH2 · LH1)) + ((LV1 · LV2 LV3) + (LV3 · LV4 · LV5)) |
| GL2 = (LH4 · LH2) + (LV1 · LV2 · LV4 · LV5) |
| GL3 = ((LH5 · LH4) + (LH2 · LH1)) + ((LV1 · LV2) + (LV4 · LV5)) |

The processing concept illustrated in FIG. 4 in connection with the logic table generates, in the portion VE, a preliminary decision for the luma/chroma separation which is also referred to as "single decision" or "coarse decision". It is based solely on the analysis of the area around the pixel being processed. This coarse decision is supported mainly by the analysis of the in-phase gradients. To ensure that combing is also performed in less clear cases, the out-of-phase gradients contribute to the decision to a smaller extent. This different weighting for developing the decision signals is also taken into account by the use of OR and AND gates 134, 176; 146, 186.

The subsequent group decision in the portion GE is more subjective since the subjective effect of two previous and two subsequent single decisions for optimum luma/chroma separation of pixel 21 has to be taken into account. A single-decoding operation with 100-percent combing, for example, is converted into combing (possibly with a smaller proportion).

The respective degree of implementation, the size of the display area, and the derivation of the logic operation may be changed to implement other embodiments and other luma/chroma separation methods.

The status signals at the output of the logic unit 144 indicate the local and temporal "similarity status" of the video signals in the area of the pixel 21 to be combed. Depending on the logic levels of these status signals, the evaluation unit 145 will generate for the pixel 21 the aforementioned processing decisions (2H-, U-, L-COMB, S-DEC) and the proportion of combing and simple decoding. How this decision is made is apparent from the flow charts of FIGS. 5A through 5D.

Figures 5A, 5B, 5C:
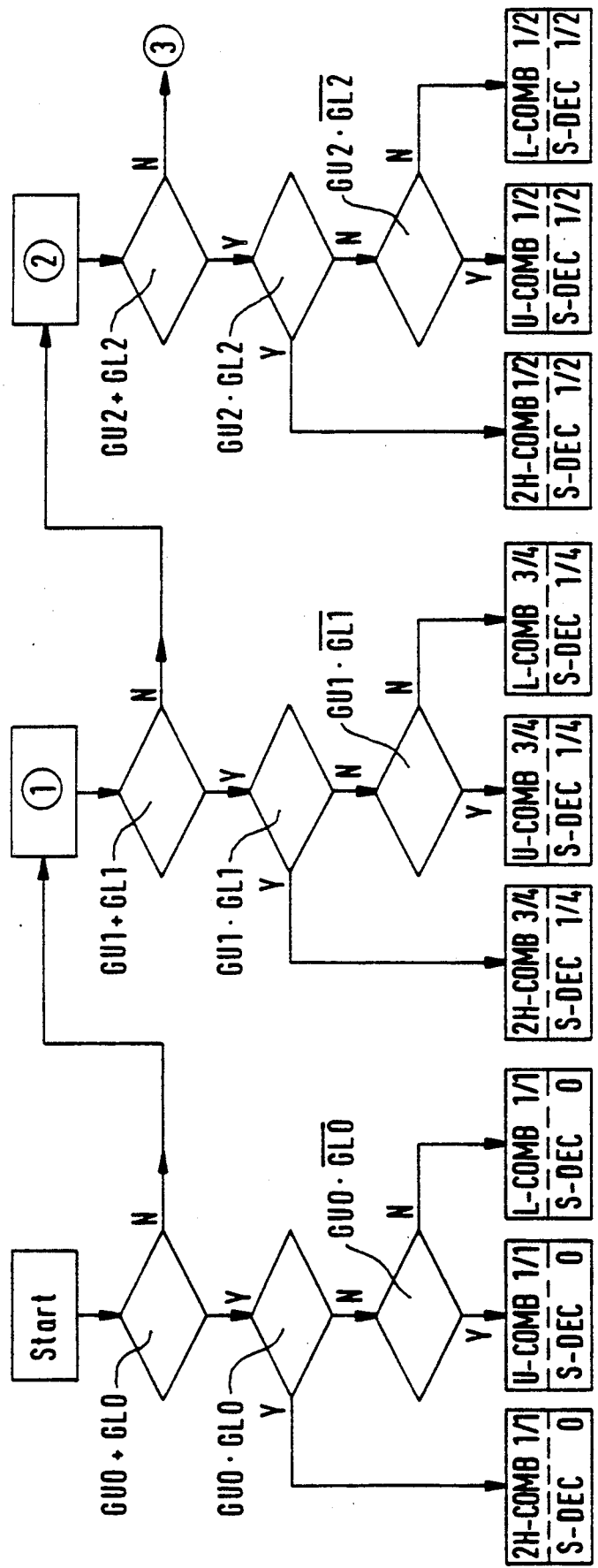
FIGS. 5A-5D comprise flow charts for making processing decisions, the flowcharts being dependent on the logic states of status signals.

In FIG. 5A, the input logic determines whether GUO or GLO is a logic 1. If the answer is yes (yes decision=Y), it is determined whether GUO and GLO are both logic 1. If that answer is yes, the decision will be to two-line comb the pixel fully and to not simple decode any portion thereof. If GUO and GLO are not 1 (no decision=N), it is determined whether GUO is equal to 1 and GLO is not equal to 1. If that is true (=Y), the decision is to comb up fully and not to simple decode. If the opposite is true (=N), the decision is to comb down fully and not to simple decode. A descending hierachy exists among the status signals 0 to 3 of the two groups, with 0 occupying the highest rank. This is taken into account in the flow charts of FIGS. 5A through 5D as the lower-ranking status signals contribute to the decision only if the higher-ranking ones do not permit an unambiguous decision.

If neither GUO nor GLO equals 1, the flow chart continues to FIG. 5B, where the query is made whether GU1 or GL1 equals 1. If yes, the query is whether both GU1 and GL1 equal 1. If yes, the decision is made to do ¾ (75%) two-line combing and ¼ (=25%) simple decoding. The processed signal will have been 75% two-line-combed and 25% simple-decoded.

Figures 5D, 6, 7:
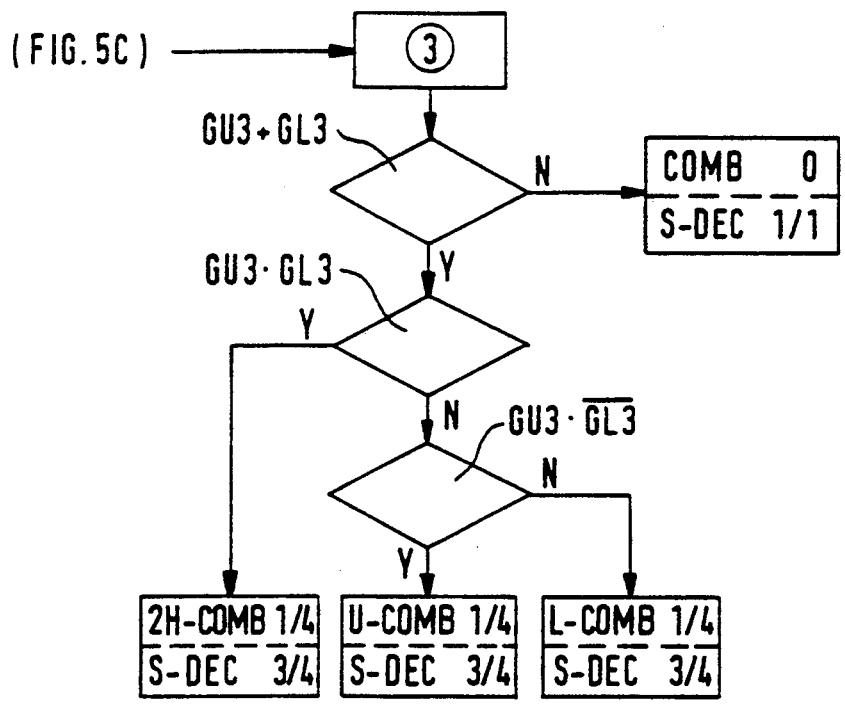
FIG. 6 is a function table showing the assignment of first logic control signals to different processing operations.
FIG. 7 is a function table showing the assignment of second logic control signals to proportions of combing and simple decoding performed.

According to the other flow charts, the processing decisions may be to perform combing and simple decoding in various proportions. Invariably, however, 25% combing is combined with 75% simple decoding, 50% combing with 50% simple decoding, and 25% combing with 75% simple decoding. If, as indicated in FIG. 5D, all of the status signals equal 0, the proportion of combing is 0%. In that case, no combing is performed at all; instead, the signal is 100% processed by simple decoding.

In FIGS. 6 and 7, the first control signals M1, M2 and the second control signals S1 through S6 are listed as binary signals in tabular form, with the first columns indicating, respectively, the type of combing to be performed and the amount determined. For a two-line combing operation, the two first control signals M1 and M2 are both logic 1. For combing up, the control signal M1 is logic 1 and the control signal M2 is logic 0. For combing down, the control signal M1 is 0 and the control signal M2 is 1.

FIG. 7 shows the assignment of the second control signals S1, S2 and S3 to the proportion of combing and the assignment of the remaining second control signals S4, S5 and S6 to the proportion of simple decoding. For full combing, S1=1, S2=0 and S3=0. For full simple decoding, S4=1, S5=0 and S6=0. As discussed, full combing is accompanied by no simple decoding—on the other hand, 25% combing, for example, is accompanied by 75% simple decoding. The combination of combing and simple decoding will therefore not change the magnitude of the video signal.

The proportions in the luma or chroma output signal must be judged in connection with the quality of the overall display. The "coarse decision", which does not take this into account, and the "fine decision", which results from the group decision, are applicable to any type of video signal.

Figure 8:
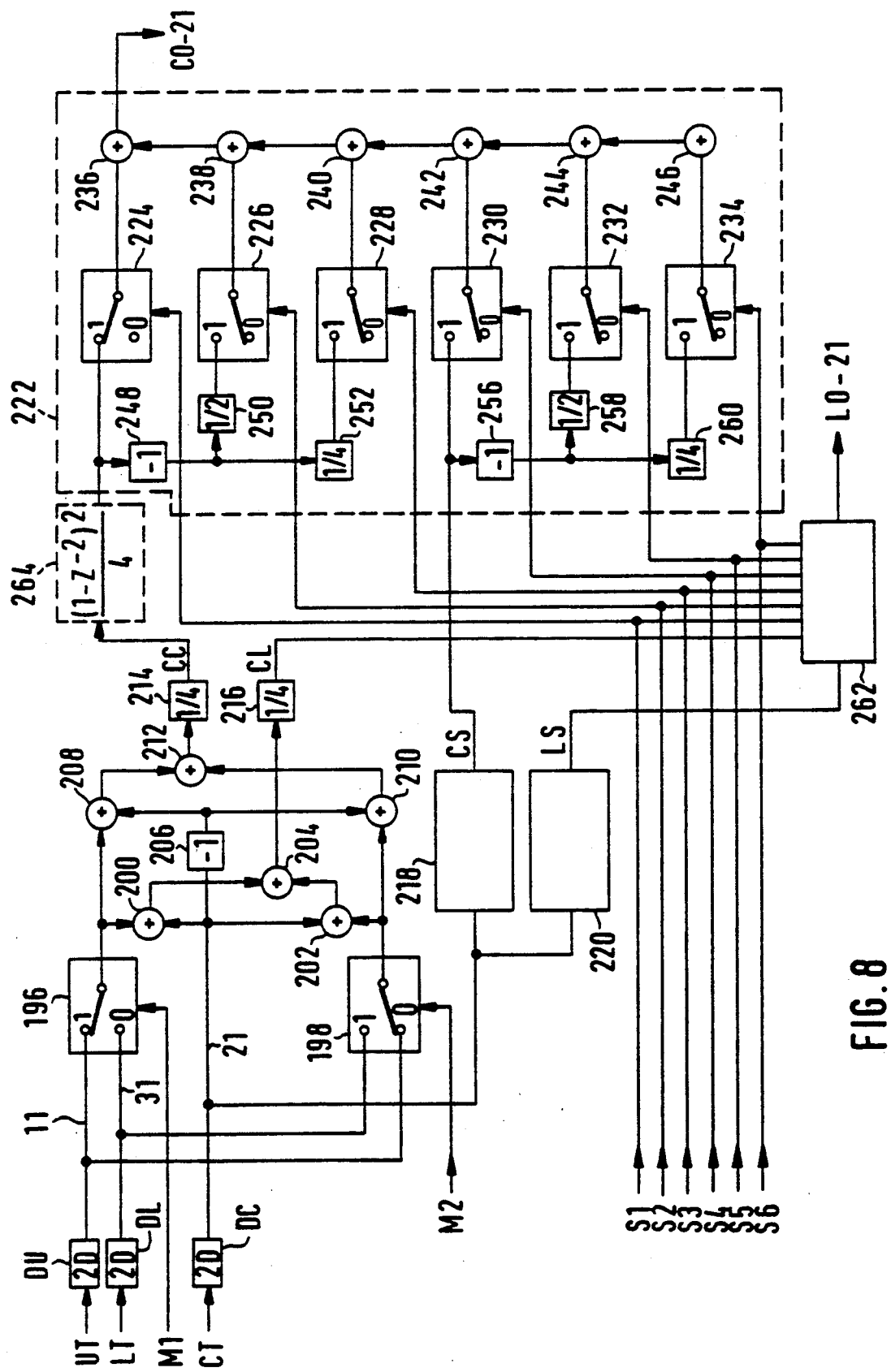
FIG. 8 is a block diagram of the luma/chroma separator with the two signal mixers for the luma and chroma output signals.

The circuit in which the luma/chroma separation proper and the proportionate mixing of the signals for the pixel 21 take place is illustrated in FIG. 8. The inputs labelled UT, LT and CT correspond to the upper pixel UT, the lower pixel LT and the center pixel CT, respectively, in the current display area of FIG. 2. They are delayed by the two-pixel delay circuits DU, DL and DC to form the signals of the current pixels 11, 21, and 31, respectively. The inputs labelled M1, M2 and S1 through S6 correspond to the control signals M1, M2 and S1 through S6 of FIGS. 6 and 7, which are developed based on the flow-chart decision according to FIGS. 5A through 5D. Two electronic switches 196 and 198 are controlled by the control signals M1 and M2, respectively, for supplying the upper and lower pixels UT, LT to different adders. The output of the switch 196 is coupled to one input of an adder 200 and to one input of an adder 208. The output of the switch 198 is coupled to one input of an adder 202 and to one input of an adder 210. The center pixel CT is coupled to the other inputs of the adders 200 and 202 and through an inverter 206 to the other inputs of the adders 208 and 210. The adders 200 and 202 feed an adder 204, and the adders 208 and 210 feed an adder 212. The switch inputs are designated "1" and "0", which correspond to the logic states "1" and "0" of the applied control signal.

With switch 196 in position 1, the delayed upper pixel UT is applied to the adder 200 and added to the delayed center pixel CT, thus combing the two pixels in the two upper horizontal lines. Similarly, the switch 198 is in its 0 position, in which the delayed upper pixel UT is passed to the adder 202, where its value is added to the delayed center pixel CT. The adder 200 thus combs the current pixels 11 and 21 and develops a 2L (twice luma) signal and no chroma. The adder 202 similarly adds the current pixels 11 and 120 to develop a 2L signal. The two double-luma signals 2L are added in the adder 204, whose output thus provides four times the luma signal value, i.e., a 4L signal. This signal is divided by four in a divide-by-four stage 216 to develop the combed luma signal CL for the pixel 21.

Pixel 11 is also applied to the adder 208 along with inverted pixel 21. The adder 208 therefore subtracts the value of pixel 21 from the value of pixel 11 to produce a double-chroma signal 2C. Similarly, the switch 198 is in its O position, in which it applies the pixel 11 to one input of the adder 210, whose other input is supplied with the inverted pixel 21. This subtraction, too, produces the double-chroma signal 2C. The two double-chroma signals 2C are added in the adder 212, whose output is divided by four in a divide-by-four stage 214 to produce the combed chroma signal CC. This signal conversion is thus a two-line combing operation for the pixel 21.

A signal mixer 222 (bounded by a dashed line in FIG. 8) for the chroma signal includes six additional electronic switches 224, 226, 228, 230, 232, and 234 which are controlled by signals S1 through S6, respectively. An identical mixer for the luma signal is indicated in the simplified block 262. Its output provides the luma output signal LO-21.

In the signal mixer 222 for the chroma signal, the ccmbed chroma signal CC is applied to the input 1 of the switch 224 and to an inverter 248. The output of the inverter 248 is applied to a divide-by-two stage 250 which feeds the input 1 of the switch 226, and it is divided by four in a divide-bv-four staqe 252 whose output is connected to the input 1 of the switch 228. The switches 224, 226 and 228 thus determine the proportion of the combed chroma signal CC contained in the chroma output signal CO-21.

The delayed center pixel CT is also applied to a chroma bandpass filter 218 and a chroma trap 220. The output of the chroma trap 220, which provides the unprocessed luma signal LS, is applied to a signal mixer for the luma signal. The output of the chroma bandpass filter 218, which provides the unprocessed chroma signal CS, is applied to the input 1 of the switch 230 and to an inverter 256. The latter produces a negative (inverted) chroma signal which is supplied to a divide-by-two stage 258 that feeds the input 1 of the switch 232, and to a divide-by-four stage 260 that feeds the input 1 of the switch 234.

As mentioned, the positions of the individual switches in the chroma signal mixer 222 are controlled by the second control signals S1 through S6. The outputs of the switches are coupled to six series-connected adders 246, 244, 242, 240, 238, and 236. The order in which the switch outputs are associated with the adders is 234, 232, 230, 228, 226, and 224, with the switch 234 coupled to the adder 246 and, finally, the switch 224 coupled to the last adder 236, whose output provides the mixed chroma output signal. The respective signal components are determined by a combination of the individual switch positions in the chroma signal mixer 222.

As can be seen from FIGS. 6 and 7, the type of combing operation is determined by the two first control signals M1 and M2, and the proportion of combing and simple decoding is determined by the six second control signals S1 through S6. For example, assuming that the control signals S1=1, and all other control signals S2=S3=S4=S5=S6=0 (corresponding to full combing and zero simple decoding), the combed chroma signal CC can be taken fully from the output of the adder 236, because switches 226 and 228 are in their O positions, cf. FIG. 8. The unprocessed chroma signal CS is not passed by any of the switches 230, 232 and 234, since these are in their 0 positions, cf. FIG. 8, because the control signals S4, S5 and S6 are in the logic 0 state. Thus the adder ly supplied with the combed chroma signal CC via the switch 224, which signal constitutes 100% of the chroma output signal.

If the chroma output signal is to consist, for example, of a ¾ portion of combing and a ¼ portion of simple decoding, the control signals are at the following logic levels: the control signal S2=0 and all other control signals S1=S3=S4=S5=S6=1. With this control combination, the combed chroma signal CC (100%) is coupled to the adder 236 through the switch 224, and one quarter is subtracted therefrom by means of the switch 228, which is in position 1. The result is that the adder 236 sees only three quarters of the combed chroma signal CC. The unprocessed chroma signal CS is fully passed on by the switch 230. From this value, one half is subtracted by means of the switch 232 and one quarter is subtracted by means of the switch 234. This results in the adder 236 seeing only one quarter of the unprocessed chroma signal CS.

The other proportions follow from the other combinations of the control signals S1 through S6 in connection with the respective type of combing operation determined by the two first control signals M1 and M2. As the operation of the luma signal mixing circuit (=block 262) is identical, this circuit will not be described here.

In FIG. 8, a further improvement is indicated by a band-pass filter 264 (shown by a dashed line). This is a chroma bandpass filter, e.g., with the digital frequency response $0.25(1-Z^{-2})^2$, which frees the combed chroma signal CC from luma residues obtained, for example, by combing a noisy video signal.

We claim:

1. A method of two-line comb filtering the luma and chroma components in a sampled composite television signal which corresponds to the NTSC color-television standard in paraticular and is sampled and digitized at four times the color subcarrier frequency, said method comprising the steps of:

determining, within a display area, a number of vertical, horizontal, adn diagonal gradients, the display area embracing pixels of three consecutive lines, wherein said display area, as seen from a center pixel (CT), embraces in the horizontal direction at least three pixels in the upper line and in the lower line and at least five pixels in the middle line, each of the pixels directly surrounding the center pixel (CT) is determined by at least one of the gradients, and the diagonal gradients are formed between in-phase pixels; and deciding, based upon a gradient analysis, as to whether to two-line comb (=2H-comb), comb up (=U-COMB), comb down (=L-COMB) or simple decode (=S-DEC), wherein the decision as to the type of combing to be performed for the respective pixel to be combed is made by single decision (VE) and a group decision (GE), the respective single decision (VE) is made based upon the evaluation of predetermined similarity criteria of the unfiltered pixels of the display area (27) for an instantaneous picture content, and the actual processing decision as to the type of combing to be performed for the pixel to be combed is made based upon the group decision (GE), which represents an evaluation of successive single decisions (VE) for successive picture contents.

2. The method as claimed in claim 1, wherien the filtered luma and chroma signals are composed of signal components of the respective type of combing and simple decoding, the respective proportion of combing and simple decoding being also determined by the group decision (GE).

3. The method as claimed in claim 1, wherein:

the display area (27) contains three pixels (12, 13, 14) lying side-by-side in the upper line, five pixels (21, 22, 23, 24, 25) lying side-by-side in the middle line, and three pixels (32, 33, 34) lying side-by-side in the lower line, with the central pixels (13, 23, 33) (=upper, =center, =lower pixel (UT, CT, LT)) of all three lines being vertically aligned; and from the unfiltered video signal values of the individual pixels, the following gradients are formed as absolute values:

gradient U1 from pixels 13 adn 25,
gradient U2 from pixels 13 and 21,
gradient U3 from pixels 12 and 24,
gradient U4 from pixels 14 and 22,
gradient L1 from pixels 25 and 33,
gradient L2 from pixels 21 and 33,
gradient L3 from pixels 24 and 32,
gradient L4 from pixels 22 and 34,
gradient UV from pixels 13 and 23,
gradient LV from pixels 23 and 33,
gradient H1 from pixels 21 and 25, and gradient H2 from pixels 22 and 24.

4. The method as claimed in alim 3, wherien during the single decision (VE), the following four concurrent single-decision signals are developed from the gradients:

$UH1 = ((H1)/2 \geq (U1 + U2)/4) \ [+] \ ((H1)/2 \geq (U3 + U4)/4),$ $UV1 = (H1 \geq UV/4) \cdot ((H2)/4 \geq UV),$ $LH1 = ((H1)/2 \geq (L1 + L2)/4) \ [+] \ ((H1)/2 \geq (L3 + L4)/4),$ and $LV1 = (H1 \geq LV/4) \cdot ((H2)/4 \geq LV),$ where "+" indicates an OR operation, "[+]" indicates a summing function, and "·" indicates an AND operation.

5. The method as claimed in claim 4, wherein:
for the group decision (GE), the following eight status signals, which define a local and temporal similarity status of the video signal in the area of the pixel to be combed, are from five successive single-decision signals each consisting of the four concurrent single-decision signals (UHi, UVi, LHi, LVi) where i=1 represents the current decision signal and i=2, ip32 3, i=4, and i=5 represent the four previous decision signals:

$GU0 = (UH3) + (UV2 \cdot UV3 \cdot UV4)$ $GU1 = ((UH5 \cdot UH4 \cdot UH2 \cdot UH1)) + ((UV1 \cdot UV2 \cdot UV3) + (UV3 \cdot UV4 \cdot UV5))$ $GU2 = (UH4 \cdot UH2) + (UV1 \cdot UV2 \cdot UV4 \cdot UV5)$ $GU3 = ((UH5 \cdot UH4) + (UH2 \cdot UH1)) + ((UV1 \cdot UV2) + (UV4 \cdot UV5))$ $GL0 = (LH3) + (LV2 \cdot LV3 \cdot LV4)$ $GL1 = ((LH5 \cdot LH4 \cdot LH2 \cdot LH1)) + ((LV1 \cdot LV2 \cdot LV3) + (LV3 \cdot LV4 \cdot LV5))$ $GL2 = (LH4 \cdot LH2) + (LV1 \cdot LV2 \cdot LV4 \cdot LV5)$ $GL3 = ((LH5 \cdot LH4) + (LH2 \cdot LH1)) + ((LV1 \cdot LV2) + (LV4 \cdot LV5));$ and via a logic evaluation fo said eight status signals, the respective processing decision 2H-, U-, L- COMB or S-DEC and a respective proportion of comb filter processing and simple decoding of the luma and chroma output signals are determined.

6. The method as claimed in claim 5, wherein the respective processing decision is defined by one of the following logic combinations of the eight status signals:

100% 2H-COMB and 0% S-DEC: (GU0·GL0),

100% U-COMB and 0% S-DEC: (GU0·$\overline{GL0}$),

100% L-COMB and 0% S-DEC: ($\overline{GU0}$·GL0),

75% 2H-COMB and 25% S-DEC:
($\overline{GU0 \cdot GL0}$)·(GU1·GL1),

75% U-COMB and 25% S-DEC:
($\overline{GU0 \cdot GL0}$)·(GU1·$\overline{GU1}$),

75% L-COMB and 25% S-DEC:
($\overline{GU0 \cdot GL0}$)·($\overline{GU1}$·GL1),

50% 2H-COMB and 50% S-DEC:
($\overline{GU0 \cdot GL0}$)·($\overline{GU1 \cdot GL1}$)·(GU2·GL2).

50% U-COMB and 50% S-DEC:
($\overline{GU0 \cdot GL0}$)·($\overline{GU1 \cdot GL1}$)·($\overline{GU2 \cdot GL2}$), 25% 2H-COMB and 75% S-DEC:
($\overline{GU0 \cdot GL0}$)·($\overline{GU1 \cdot GL1}$)·GU2·GL2)·(GU3·GL3), ($\overline{GU0 \cdot GL0}$)·($\overline{GU1 \cdot GL1}$)·($\overline{GU2 \cdot GL2}$)·GU3·$\overline{GL3}$), 25% L-COMB and 75% S-DEC:
($\overline{GU0 \cdot GL0}$)·($\overline{GU1 \cdot GL1}$)·($\overline{GU2 \cdot GL2}$)·($\overline{GU3}$·GL3), and 0% COMB and 100% S-DEC:
($\overline{GU0 \cdot GL0}$)·($\overline{GU1 \cdot GL1}$)·($\overline{GU2 \cdot GL2}$)·($\overline{GU3 \cdot GL3}$).

7. The method as claimed in calim 4, wherein:
the single-decision signals UV1 and LV1 are dependent both on the horizontally oriented gradients H1, H2 and on an absolute threshold value (=S):

$UV1 = ((H1 \geq UV/4) + (UV/4 \leq S) \cdot (((H2)/4 \geq UV) + (UV \leq S))$ and $LV1 = ((H1) \geq LV/4) + (LV/4 \leq S) \cdot (((H2)/4 \geq LV) + (LV \leq S)),$ where "+" indicates an OR operation and "·" indicates an AND operation.

8. The method as claimed in claim 6, including the step of bandpassing the combed chroma signal (CC) before it is mixed with the unprocessed chroma signal (CS), the pass band characteristic, except for a scale factor, being defined by $(1-z^{-2})^2$, and the sampling frequency being four times the color subcarrier frequency.

9. A circuit arrangement for two-comb filtering, comprising:
a gradient-measuring device containing storage means and arithmetic-logic means for determining, within a display area, a number of vertical, horizontal, and diagonal gradients, the display area embracing pixels of three consecutive lines; and
a group decision logic means containing the following additional subcircuits;
a single-decision logic (VE) for generating from said gradients the following concurrent single-decision signals:

$UH1 = ((H1)/2 \geq (U1 + U2)/4) \ [+] \ ((H1)/2 \geq (U3 + U4)/4),$ $UV1 = (H1 \geq UV/4) \cdot ((H2)/4 \geq UV),$ $LH1 = ((H1)/2 \geq (L1 + L2)/4) \ [+] \ ((H2)/2 \geq (L3 + L4)/4),$ and $LV1 = (H1 \geq LV/4) \cdot ((H2)/4 \geq LV),$ where "+" indicates an OR operation, "[+]" indicates a summing function, and "·" indicates an AND operation.

storage means for simultaneously sampling at least five successive single-decision signals each containing the four concurrent single-decision signals (UHi, UVi, LHi, LVi) where i=1 represents the current decision signal and i=2, i=3, i=4, and i=5 represent the four previous decision signals;

a logic unit for forming at least eight status signals (GU0 through GU3 and GL0 through GL3) from the applied single-decision signals as follows:

$$GU0=(UH3)+(UV2 \cdot UV3 \cdot UV4)$$

$$GU1=((UH5 \cdot UH4 \cdot UH2 \cdot UH1))+((UV1 \cdot UV2 \cdot UV3)+(UV3 \cdot UV4 \cdot UV5))$$

$$GU2=(UH4 \cdot UH2)+(UV1 \cdot UV2 \cdot UV4 \cdot UV5)$$

$$GU3=((UH5 \cdot UH4)+(UH2 \cdot UH1))+((UV1 \cdot UV2)+(UV4 \cdot UV5))$$

$$GL0=(LH3)+(LV2 \cdot LV3 \cdot LV4)$$

$$GL1=((LH5 \cdot LH4 \cdot LH2 \cdot LH1))+((LV1 \cdot LV2 \cdot LV3)+(LV3 \cdot LV4 \cdot LV5))$$

$$GL2=(LH4 \cdot LH2)+(LV1 \cdot LV2 \cdot LV4 LV5)$$

$$GL3=((LH5 \cdot LH4)+(LH2 \cdot LH1))+((LV1 \cdot LV2)+(LV4 \cdot LV5));$$

an evaluation unit in which the decision as to the type of combing (2H-, U-, L-COMB) and the proportion of comb processing and simple decoding to be performed is made by logically combining the applied status signals; and a luma-chroma separator containing first devices for performing the different types of combing, second devices for single decoding the composite luma-chroma signal, a chroma signal mixer, and a luma signal mixer, the different types of combing and proportions being determined by electronic switches controlled by output signals (M1, M2, S1 through S6) from the evaluation unit.

10. An apparatus for two-line comb filtering the luma and chroma components in a sampled composite television signal which corresponds to the NTSC color-television standard in particular and is sampled and digitized at four times the color subcarrier frequency, said apparatus comprising:

analyzing means for determining and analyzing, within a display area, a number of vertical, horizontal, and diagonal gradients, the display area embracing pixels of three consecutive lines, wherein said display area, as seen from a center pixel (CT), embraces in the horizontal direction at least three pixels in the upper line and in the lower line and at least five pixels in the middle line, each of the pixels directly surrounding the center pixel (CT) is determined by at least one of the gradients, and the diagonal gradients are formed between in-phase pixels; and selecting means coupled to said analyzing means for deiciding, based upon a gradient analysis, as to whether to two-line comb (=2H-COMB), comb up (=U-COMB), comb down (=L-COMB) or simple decode (=S-DEC), said selecting means including:

means for deciding, by a single decision (VE) and a group decision (GE), the type of combing to be performed for the respective pixel to be combined;

means for making the respective single decision (VE) based upon the evaluation of predetermined similarity criteria of the unfiltered pixels of the display area (27) for an instantaneous picture content; and means for deciding the actual processing decision as to the type of combing to be performed for the pixel to be combed based upon the group decision (GE), which represents an evaluation of successive single decisions (VE) for successive picture contents.

11. The apparatus as cliamed in claim 10, wherein the filtered luma and chroma signals are composed of signal components of the respective type of combing and simple decoding, and including means for determining the respective proportion of combing and simple decoding by the group decision (GE).

12. The appartus as claimed in cliam 10, wherein:

the display area (27) contains three pixels (12, 13, 14) lying side-by-side in the upper line, five pixels (21, 22, 23, 24, 25) lying side-by-side in te middle line, and three pixels (32, 33, 34) lying side-by-side in the lower line, with the central pixels (13, 23, 33) (=upper, =center, =lower pixel (UT, CT, LT)) of all three lines being vertically aligned; and from the unfiltered video signal values of the individual pixels, said analyzing means forms the following gradients as absolute values:

gradient U1 from pixels 13 and 25,
gradient U2 from pixels 13 and 21,
gradient U3 from pixels 12 and 24,
gradient U4 from pixels 14 and 22,
gradient L1 from pixels 25 and 33,
gradient L2 from pixels 21 and 33,
gradient L3 from pixels 24 and 32,
gradient L4 from pixels 22 and 34,
gradient UV from pixels 13 and 23,
gradient LV from pixels 23 and 33,
gradient H1 from pixels 21 and 25, and
gradient H2 from pixels 22 and 24.

13. The apparatus as claimed in calim 12, wherein during the single decision (VE), said selecting means develops the following four concurrent single-decision signals from the gradients:

$$UH1=((H1)/2 \geq (U1+U2)/4)$$
$$((H1)/2 \geq (U3+U4)/4),$$

$$UV1=(H1 \geq UV/4) \cdot ((H2)/4 \geq UV),$$

$$LH1=((H1/2 \geq (L1+L2)) ((H1)/2 \geq (L3+L4)/4),$$
and $$LV1=(H1 \geq LV/4) \cdot ((H2)/4 \geq LV),$$

where "+" indicates an OR operation and "·" indicates an AND operation.

14. The apparatus as claiemd in claim 13, wherein:

for the group decision (GE), said selecting means forms the following eight status signals, which define a local and temporal similarity status of the video signal in the area of the pixel to be combed, from five successive single-decision signals each consisting of the four concurrent single-decision signals (UHi, UVi, LHi, LVi) where i=1 represents the current decision signal and i=2, i=3, i=4, and i=5 represent the four previous decision signals:

$$GU0=(UV3)+(UV2 \cdot UV3 \cdot UV4)$$

$GU1 = ((UH5 \cdot UH4 \cdot UH2 \cdot UH1)) + (((UB1 \cdot UV2 \cdot UV3) + (UV3 \cdot UV4 \cdot UV5))$ $GU2 = (UH4 \cdot UH2) + (UV1 \cdot UV2 \cdot UV4 \cdot UV5)$ $GU3 = ((UH5 \cdot UH4) + ((UV1 \cdot UV2) + (UV4 \cdot UV5))$ $GL0 = (LH3) + (LV2 \cdot LV3 \cdot LV4)$ $GL1 = ((LH5 \cdot LH4 \cdot LH2 LH1)) + ((LV1 \cdot LV2 \cdot LV3) + (LV3 \cdot LV4 \cdot LV5))$ $GL2 = (LH4 \cdot LH2) + (LV1 \cdot LV2 \cdot LV4 \cdot LV5)$ $GL3 = ((LH5 \cdot LH4) + (LH2 \cdot LH1)) + ((LV1 \cdot LV2) + (LV4 \cdot LV5));$ and via a logic evaluation of said eight status signals, the respective processing decision 2H-, U-, L-COMB or S-DEC and a respective proportion of comb filter processing and simple decoding of the luma and chroma output signals are determined.

15. The apparatus as cliamed in claim 14, wherein the respective processing decision is defined by one of the following logic combinations of the eight staus signals:

100% 2H-COMB and 0% S-DEC: (GU0·GL0),

100% U-COMB and 0% S-DEC: (GU0·$\overline{GL0}$),

100% L-COMB and 0% S-DEC: ($\overline{GU0}$·GL0),

75% 2H-COMB and 25% S-DEC: ($\overline{GU0 \cdot GL0}$)·(GU1·GL1),

75% U-COMB and 25% S-DEC: ($\overline{GU0 \cdot GL0}$)·(GU1·$\overline{GU1}$),

75% L-COMB and 25% S-DEC: ($\overline{GU0 \cdot GL0}$)·($\overline{GU1}$·GL1),

50% 2H-COMB and 50% S-DEC:

($\overline{GU0 \cdot GL0}$)·($\overline{GU1 \cdot GL1}$)·(GU2·GL2),

50% U-COMB and 50% S-DEC:

($\overline{GU0 \cdot GL0}$)·($\overline{GU1 \cdot GL1}$)·(GU2·$\overline{GL2}$), 25% 2H-COMB and 75% S-DEC:

($\overline{GU0 \cdot GL0}$)·($\overline{GU1 \cdot GL1}$)·($\overline{GU2 \cdot GL2}$)·(GU3·GU3), ($\overline{GU0 \cdot GL0}$)·($\overline{GU1 \cdot GL1}$)·($\overline{GU2 \cdot GL2}$)·GU3·$\overline{GL3}$), 25% L-COMB and 75% S-DEC:

($\overline{GU0 \cdot GL0}$)·($\overline{GU1 \cdot GL1}$)·($\overline{GU2 \cdot GL2}$)·($\overline{GU3}$·GL3), and 0% COMB and 100% S-DEC:

($\overline{GU0 \cdot GL0}$)·($\overline{GU1 \cdot GL1}$)·($\overline{GU2 \cdot GL2}$)·($\overline{GU3 \cdot GL3}$).

16. The apparatus as claimed in claim 13, wherein: the single-decision signals UV1 and LV1 are dependent both on the horizontally oriented gradients H1, H2 and on an absolute threshold value (=S):

$UV1 = ((H1 \geq UV/4) + (UV/4 \leq S) \cdot (((H2)/4 \geq UV) + (UV \leq S))$ and $LV1 = ((H1) \geq LV/4) + (LV/4 \leq S) \cdot (((H2)/4 \geq LV) + LV \leq S)),$ where "+" indicates an OR operation and "·" indicates an AND operation.

17. The apparatus as claimed in claim 15, including means for bandpassing the combed chroma signal (CC) before it is mixed with the unprocessed chroma signal (CS), the passband characteristic, except for a scale factor, being defined by $(1-z^{-2})^2$, and the sampling frequency being four times the color subcarrier frequency.

* * * * *